(12) United States Patent
Levonas

(10) Patent No.: US 9,100,507 B2
(45) Date of Patent: Aug. 4, 2015

(54) CUSTOMER PREMISE SELT BASED METHOD FOR DETECTING THE PRESENCE OF A MICRO-FILTER ON A VDSL CONNECTION

(71) Applicant: IKANOS COMMUNICATIONS, INC., Fremont, CA (US)

(72) Inventor: Robin Levonas, Holmdel, NJ (US)

(73) Assignee: IKANOS COMMUNICATIONS, INC., Fremont, CA (US)

( * ) Notice: Subject to any disclaimer, the term of this patent is extended or adjusted under 35 U.S.C. 154(b) by 0 days.

(21) Appl. No.: 14/069,831

(22) Filed: Nov. 1, 2013

(65) Prior Publication Data
US 2014/0126705 A1    May 8, 2014

Related U.S. Application Data

(60) Provisional application No. 61/722,330, filed on Nov. 5, 2012.

(51) Int. Cl.
 *H04M 1/24*  (2006.01)
 *H04M 3/08*  (2006.01)
 *H04M 3/22*  (2006.01)
 *H04M 11/06*  (2006.01)

(52) U.S. Cl.
 CPC .................................. *H04M 11/062* (2013.01)

(58) Field of Classification Search
 CPC ......... H04L 43/04; H04L 43/06; H04L 43/50; H04L 12/2697; H04L 41/06777; H04L 41/0803; H04B 3/46; H04B 3/50; H04B 3/52; H04B 5/00; H04M 1/24; H04M 3/306; H04M 11/062; H04M 3/2209; H04M 3/301
 USPC .......... 379/1.01, 1.03, 1.04, 21, 22.02, 22.08, 379/24, 27.01, 27.02, 27.03, 29.07, 29.08, 379/30, 32.01, 22.01, 22.03
 See application file for complete search history.

(56) References Cited

U.S. PATENT DOCUMENTS

| | | | |
|---|---|---|---|
| 7,519,110 B2 * | 4/2009 | Shrikhande et al. ........... | 375/222 |
| 8,102,902 B2 * | 1/2012 | Shrikhande et al. ........... | 375/222 |
| 2002/0176490 A1 | 11/2002 | Kamali et al. | |
| 2003/0055992 A1 | 3/2003 | Miller | |
| 2004/0120470 A1 * | 6/2004 | Cambron et al. ............. | 379/1.04 |

(Continued)

FOREIGN PATENT DOCUMENTS

| | | |
|---|---|---|
| WO | WO 2006-058908 A1 | 6/2006 |
| WO | WO 2011-142741 A1 | 11/2011 |

OTHER PUBLICATIONS

International Search Report and Written Opinion issued Feb. 14, 2014 for PCT/US2013/068013.

*Primary Examiner* — Binh Tieu
(74) *Attorney, Agent, or Firm* — Pillsbury Winthrop Shaw Pittman LLP

(57) ABSTRACT

The present invention relates generally to a customer premises based method for detecting the presence of a micro-filter on a VDSL connection. According to certain aspects, the method uses SELT test signals that are transmitted from the customer premises modem and whose associated echo signals are received and analyzed by the customer premises modem. According to further aspects, specific characteristics of several different SELT signals are utilized to robustly and effectively determine the presence or absence of the micro-filter/splitter.

22 Claims, 3 Drawing Sheets

(56) References Cited

U.S. PATENT DOCUMENTS

| | | |
|---|---|---|
| 2006/0198500 A1* | 9/2006 | Defoort .................... 379/1.01 |
| 2007/0165533 A1 | 7/2007 | Wu |
| 2007/0165788 A1* | 7/2007 | Defoort et al. ............. 379/1.04 |
| 2009/0201976 A1* | 8/2009 | Shrikhande et al. ......... 375/222 |
| 2009/0268797 A1 | 10/2009 | Cunningham |
| 2011/0188640 A1* | 8/2011 | Cioffi et al. ............... 379/27.01 |
| 2012/0026908 A1* | 2/2012 | Tzannes et al. ............. 370/252 |
| 2012/0221685 A1 | 8/2012 | Wu et al. |
| 2012/0306895 A1* | 12/2012 | Faulkner et al. ............ 345/501 |
| 2012/0307982 A1* | 12/2012 | Faulkner et al. .......... 379/27.01 |
| 2012/0307983 A1* | 12/2012 | Faulkner et al. .......... 379/29.03 |
| 2013/0101092 A1* | 4/2013 | Wahl et al. ................. 379/21 |

\* cited by examiner

CUSTOMER PREMISE SELT BASED METHOD FOR DETECTING THE PRESENCE OF A MICRO-FILTER ON A VDSL CONNECTION

CROSS-REFERENCE TO RELATED APPLICATIONS

The present application claims priority to U.S. Prov. Appln. No. 61/722,330, filed Nov. 5, 2012, the contents of which are incorporated herein by reference in their entirety.

FIELD OF THE INVENTION

The present invention relates generally to data communications, and more particularly to a customer premises based method for detecting the presence of a micro-filter on a VDSL connection.

BACKGROUND OF THE INVENTION

ADSL and VDSL modems transmit and receive data using a twisted pair telephone wire. The ADSL/VDSL data connection is established between a customer premise installed modem and a central office modem. At the customer premise (CP), the twisted pair used as the ADSL/VDSL communication channel can also serve as the same channel used for voice communication, commonly known as Plain Old Telephone Service (POTS). Since the channel is shared between the two separate services, it is desirable to isolate one from the other such that interference is not coupled into the other service.

The device which provides this isolation is known as an ADSL/VDSL micro filter or splitter. The purpose of this device is to separate the POTS voice channel from the ADSL/VDSL data channel. In the case of a micro filter, the device is typically installed between the wall plate and the POTS telephone. In general, any telephone which shares the data connection with the ADSL/VDSL modem must have a micro filter installed to prevent interference from being heard while using a voice telephone. The device itself is typically a simple low-pass filter which passes low frequencies, those less than approximately 4 KHz and blocks high frequencies, those greater than 4 KHz.

A common issue with this type of arrangement is that a customer often incorrectly installs the micro filter, and puts the filter on the line connecting the wall to the ADSL/VDSL modem, thus rendering it useless since frequency bands used by the ADSL/VDSL modem are completely blocked by the micro-filter. It is therefore desirable to detect this condition and resolve it without having the customer make a service call to the ADSL/VDSL service provider.

SUMMARY OF THE INVENTION

The present invention relates generally to a customer premises based method for detecting the presence of a micro-filter on a VDSL connection. According to certain aspects, the method uses SELT test signals that are transmitted from the customer premises modem and whose associated echo signals are received and analyzed by the customer premises modem. According to further aspects, specific characteristics of several different SELT signals are utilized to robustly and effectively determine the presence or absence of the micro-filter/splitter.

In accordance with these and other aspects, embodiments of the invention provide a customer premise based method for detecting the presence of a micro-filter including transmitting, from a customer premises modem, a signal on a line connected to the customer premises modem, receiving data corresponding to a reflection of the transmitted signal, and analyzing the data to determine whether a micro-filter is connected on the line.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

As described above, the present inventors recognize that it is desirable to detect when an ADSL/VDSL modem is incorrectly connected to a micro filter or POTS splitter and convey this information to the customer in order to flag this condition such that it can be resolved without the intervention of the service provider.

The present inventors further recognized that this can be accomplished by executing a Single Ended Line Test (SELT) from the customer premises (CP) side modem. A SELT test begins with the transmission of a signal to the line while simultaneously "listening" to the echo as it is reflected back to the modem. This reflected information can, with appropriate processing, determine many of the characteristics of the channel. For example, a conventional SELT test can determine the presence of bridge taps, whether the line is open or short circuited, the line impedance and other features present in the channel. According to certain aspects, embodiments of the invention use the SELT response to also determine if there is an incorrectly installed micro filter or ADSL/VDSL splitter present.

Figure 1A:
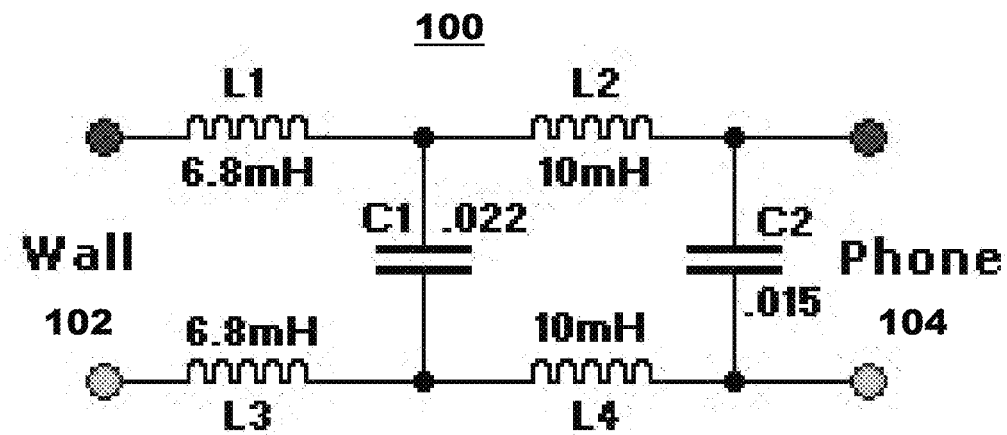
FIGS. 1A and 1B are schematic illustrations of a Typical Design of a ADSL/VDSL Micro Filter.

Referring to FIG. 1A, a circuit diagram for a typical ADSL/VDSL micro filter 100 is shown. The left "Wall" side 102 of the filter is typically plugged into a wall 108 socket and is thus connected to the central office equipment through the local loop, while the right "Phone" side 104 of the filter is connected to the telephone located at the customer premises. This is the correct configuration that will allow the low frequency voice signals to traverse the filter and reach the central office to establish the voice connection.

Figure 1B:
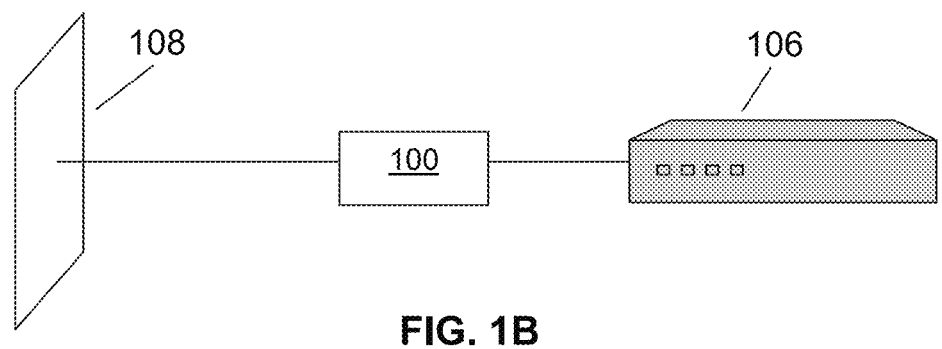

As shown in FIG. 1B, since it can be left to the user to install an ADSL/VDSL modem, it is highly possible that they will incorrectly connect their ADSL/VDSL modem 106 to the "Phone" side 104 of filter 100, in which case ADSL/VDSL service will not be possible. Since the circuit is designed to pass low frequency voice signals, the ADSL/VDSL signals will be completely blocked by the filter 100.

By transmitting a SELT signal from the CPE modem, embodiments of the invention can analyze the reflected signal to obtain information about the characteristics of the connection as seen by the ADSL/VDSL modem. For example, when the ADSL/VDSL modem 106 is connected to the "Phone" side 104 of the filter 100, the capacitor C2 will present a short circuit for very high ADSL/VDSL frequencies. Analysis of the reflected SELT signal can thus detect the presence of a short circuit by analyzing the phase response of the reflected signal.

According to embodiments of the invention, therefore, the detection of an incorrectly connected micro-filter/splitter is accomplished by a single ended line test, initiated by the CPE modem 106. This test includes transmitting and analyzing one or more signals that conform to the ADSL/VDSL band plan in the upstream direction. For example, a typical VDSL bandplan consists of three separate bands referred to as the US0, US1 and US2 bands, as would be present for a VDSL2 compliant 17A profile.

A portion of the transmitted signal is reflected back to the CPE modem 106. This signal is averaged and stored for analysis by the CPE modem. As is known in basic transmission line theory, this reflected signal is known as the S-parameter reflection coefficient, denoted S11. The S11 signal is, by definition, the ratio of the received signal divided by the transmit signal. In this case, the receive signal is nothing more than the reflected echo resulting from the signal transmitted according to the invention.

The test method of the invention can be included as part of a startup diagnostics routine for a DSL modem, for example. Additionally or alternatively, it can be included as part of an on-demand diagnostics routine that can be initiated by a user and/or the modem itself when on-line communications fail, such as that described in co-pending application Ser. No. 14/054,006, the contents of which are incorporated herein by reference.

Embodiments of the invention can be implemented by a DSL modem chipset and accompanying software/firmware, such as DSL chipsets and associated analysis software provided by Ikanos Communications Inc. Those skilled in the art will be able to understand how to implement the invention by adapting such DSL chipsets and/or software after being taught by the present disclosure.

Figure 2:
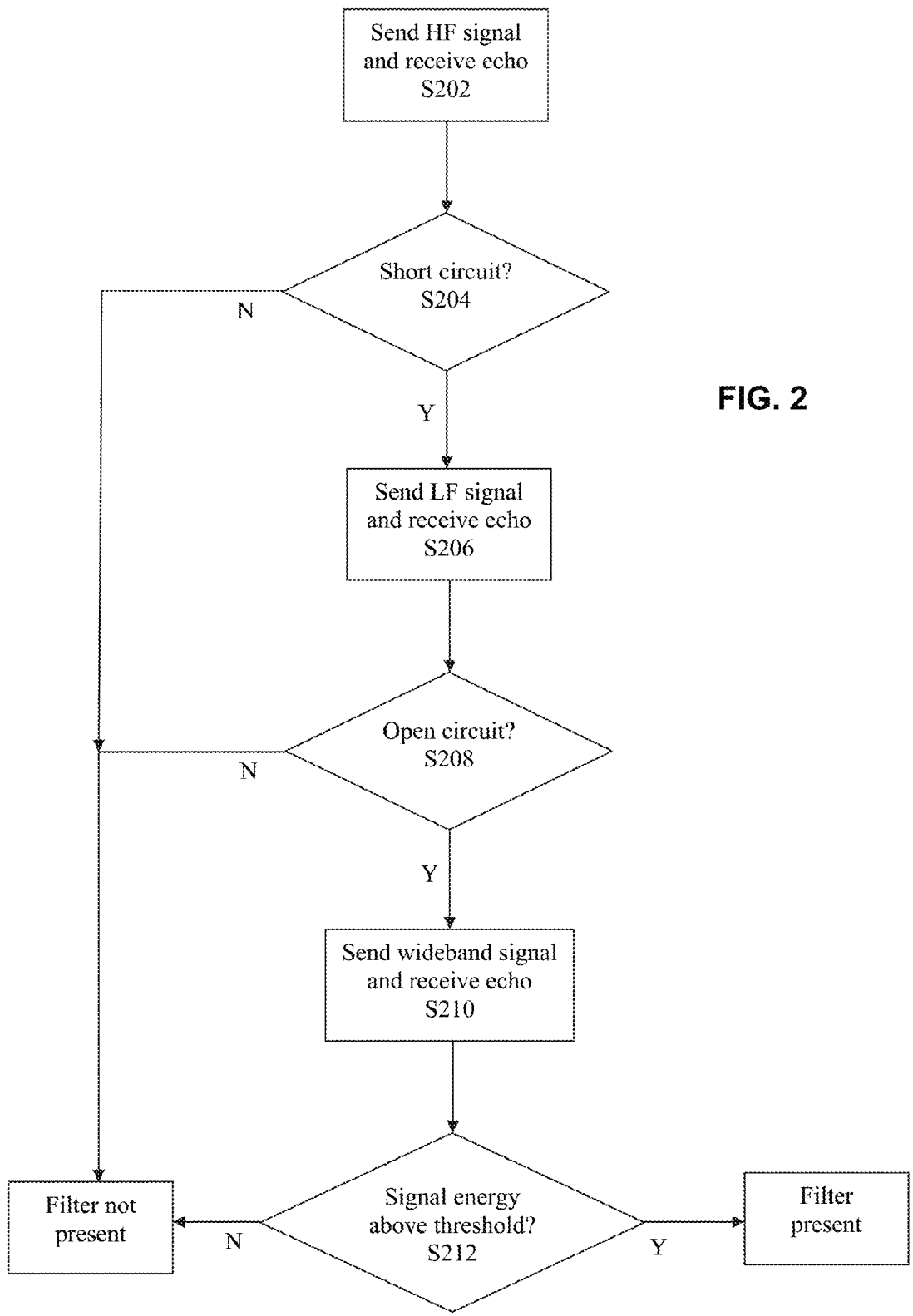
FIG. 2 is a flowchart illustrating an example method according to embodiments of the invention.

An example method according to embodiments of the invention is shown in FIG. 2.

As described above, when an ADSL/VDSL modem is incorrectly connected to the "Phone" side of a splitter/micro-filter, the modem "sees" a capacitance corresponding to C2 across the tip/ring pair. This capacitance will appear as an open circuit, or high impedance, for low frequencies and a short circuit, or low impedance, for high frequencies. Accordingly, in step S202, the CP modem transmits one or more tones in a high frequency band, for example, the US2 band (e.g. f1975 to f2800). The receiver side of the modem simultaneously listens to the received echo signal and stores data corresponding to the received signal as is done in a standard SELT measurement.

In step S204, the data corresponding to the echo signal is analyzed to determine whether the line has characteristics of a short circuit, as would be the case if a micro-filter such as that shown in FIG. 1 was connected to the modem. In embodiments, in step S204 the invention isolates within the received signal the frequency of the transmitted signal and determines the phase. This determined phase is compared to a threshold phase to determine whether a short circuit is present.

Figure 3:
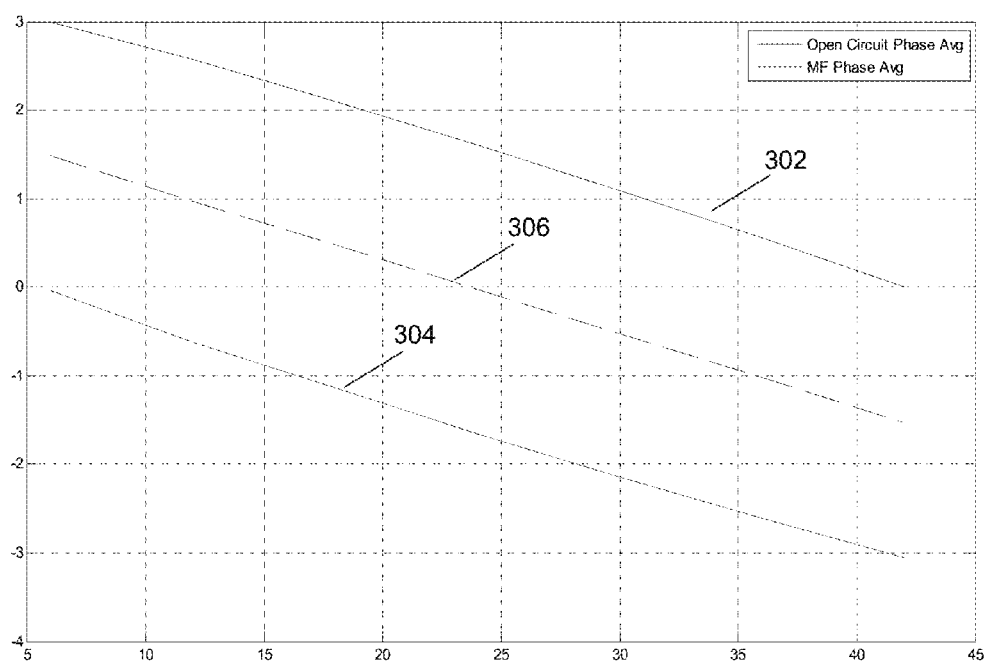
FIG. 3 is a chart illustrating how embodiments of the invention collectively provide a robust method of detecting an incorrectly installed micro-filter/splitter.

In connection with this step, the modem uses a table of phase values stored for a given set of possible transmitted frequencies and possible loop lengths. Alternatively, the modem can estimate the expected phase value by a stored first order polynomial that models the phase response versus loop length for a given gauge of wire. An example of how this table is obtained is described herein with reference to the diagram in FIG. 3. The plot in FIG. 3 is the result of an actual set of measurements made using a VDSL2 modem connected to differing lengths of loops with and without an incorrectly installed micro-filter. In particular, this diagram shows the phase response in radians for an echo signal corresponding to a transmitted signal with a given high frequency (e.g. 8.5171875 MHz) versus loop length in feet, 5 ft. to 45 ft. in this example. As can be seen, the open circuit response (curve 302) differs from the response for an incorrectly installed micro-filter (curve 304) by 180 degrees, or equivalently, pi radians. This is consistent with theory where the reflection for a short circuit is the same as an open circuit, but with a 180 degree phase shift.

Based on this, embodiments of the invention establish a decision threshold (curve 306) half way between curves 302 and 306 above which to declare normal circuit conditions and below which to declare a short circuit condition for the given transmitted frequency. This threshold is stored in the table for various values of loop length or modeled with a first order polynomial as set forth above.

To use this decision threshold in step S204, the modem first estimates the loop length by processing the S11 reflection coefficient. As is known in the art, an inverse Fourier transform can be applied to the S11 reflection coefficient. The resultant time domain signal contains "peaks" that directly correspond to the points of reflection, as seen by the modem. Based on the position of each peak, the distance to the impairment that caused the peak can be estimated. Based on the estimated loop length, step S204 includes looking up the threshold in the table or computing it from the model and comparing it to the actual received phase response.

As shown in FIG. 2, if the comparison in step S204 determines that there is no short circuit, then processing ends. However, it is possible that there might be an actual short circuit on the line. Accordingly, in embodiments such as that shown in FIG. 2, the method proceeds to step S206 in order to distinguish between an actual short circuit and that caused by an incorrectly installed micro-filter. In step S206, embodiments of the invention transmit a low frequency signal, for example, a signal having a frequency in the U0 band such as f21 (i.e. 43.125 kHz), and determines the phase response of the low frequency component of the received echo signal. Although not shown in FIG. 3, the phase response of the low frequency signal will look very similar to the one shown in that figure, and a similar threshold table for various loop lengths can be formed. In this case, the capacitance provided by C1 and C2 will appear as a high impedance and will exhibit the characteristics of an open circuit. This will be distinguishable in the phase domain by a point which lies above the decision threshold, as determined for the given loop length in step S208.

As shown in FIG. 2, if step S208 determines that there is not an open circuit, then processing ends. These two independent checks in steps 204 and 208 will provide a very good indication of the presence, or absence, of an incorrectly installed micro-filter/splitter.

However, embodiments of the invention proceed to step S210 to perform one additional final check to determine if the line is terminated in 100 ohms or not. This is the nominal impedance of both the twisted pair transmission line and the impedance of the central office equipment. In this case, the phase response could be far enough below the decision threshold such that a false positive is declared, or indicate that a micro-filter was detected when none was actually present. To circumvent this scenario, a simple magnitude check can be performed by averaging the US0 band returned signal energy. For example, in step S210 the modem transmits a wideband signal in the US0 band and averages the returned signal energy in the received echo signal in this band. The ratio of transmitted and received energy in this band is compared to a threshold in step S212, which threshold can be stored in a table in the modem. In the case of a correctly terminated line, the returned signal energy is very small compared to that when the line is incorrectly connected to a micro-filter/splitter. Accordingly, in step S212, if the received signal energy ratio is not above the threshold, it is determined that a micro-filter is not present. Otherwise, it is finally determined that micro-filter is present.

In embodiments of the invention, these three checks cover various likely possible scenarios and collectively provide a robust method of detecting an incorrectly installed micro-filter/splitter. The invention is not limited to determining the presence of an incorrectly installed micro-filter/splitter. For example, embodiments of the invention can further provide a length estimate at which the filter can be located as described above.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method comprising:
   transmitting, from a customer premises modem, a signal on a line connected to the customer premises modem;
   receiving data corresponding to a reflection of the transmitted signal;
   processing the data to obtain an estimated loop length of the line; and
   analyzing the data in accordance with the obtained loop length to determine whether a micro-filter is connected on the line.

2. A method according to claim 1, wherein the steps of transmitting, receiving and analyzing are incorporated into single ended line test (SELT) tests performed by the customer premises modem.

3. A method according to claim 1, wherein transmitting includes transmitting a high frequency signal and analyzing includes determining whether the line includes a short circuit.

4. A method according to claim 3, wherein determining includes:
   determining a phase response associated with the transmitted signal; and
   comparing the phase response to a threshold associated with a short circuit condition.

5. A method according to claim 1, wherein transmitting includes transmitting a low frequency signal and analyzing includes determining whether the line includes an open circuit.

6. A method according to claim 5, wherein determining includes:
   determining a phase response associated with the transmitted signal; and
   comparing the phase response to a threshold associated with an open circuit condition.

7. A method according to claim 1, wherein transmitting includes transmitting a wideband signal and analyzing includes determining whether the line is terminated by approximately 100 ohms.

8. A method according to claim 7, wherein determining includes:
   determining a ratio of transmitted and received energy associated with the wideband signal; and
   comparing the ratio to a threshold associated with a 100 ohm line termination condition.

9. A method according to claim 1, wherein the micro-filter is a ADSL/VDSL micro-filter/splitter.

10. A modem comprising:
    a transmitter adapted to transmit a signal on a line connected to the modem;
    a receiver adapted to receive data corresponding to a reflection of the transmitted signal; and
    a chipset programmed to process the data to obtain an estimated loop length of the line and to analyze the data in accordance with the estimated loop length to determine whether a micro-filter is connected on the line.

11. A modem according to claim 10, wherein the signal is a high frequency signal and wherein the analyzing performed by the chipset includes determining whether the line includes a short circuit.

12. A modem according to claim 11, wherein determining includes:
    determining a phase response associated with the transmitted signal; and
    comparing the phase response to a threshold associated with a short circuit condition.

13. A modem according to claim 10, wherein the signal is a low frequency signal and wherein the analyzing performed by the chipset includes determining whether the line includes an open circuit.

14. A modem according to claim 13, wherein determining includes:
    determining a phase response associated with the transmitted signal; and
    comparing the phase response to a threshold associated with an open circuit condition.

15. A modem according to claim 10, wherein the signal is a wideband signal and wherein the analyzing performed by the chipset includes determining whether the line is terminated by approximately 100 ohms.

16. A modem according to claim 15, wherein determining includes:
   determining a ratio of transmitted and received energy associated with the wideband signal; and
   comparing the ratio to a threshold associated with a 100 ohm line termination condition.

17. A modem according to claim 10, wherein the micro-filter is a ADSL/VDSL micro-filter/splitter.

18. A method comprising:
   transmitting, from a customer premises modem, a high frequency signal on a line connected to the customer premises modem;
   receiving first data corresponding to a reflection of the transmitted high frequency signal;
   transmitting, from the customer premises modem, a low frequency signal on the line connected to the customer premises modem;
   receiving second data corresponding to a reflection of the transmitted low frequency signal;
   transmitting, from the customer premises modem, a wideband signal on the line connected to the customer premises modem;
   receiving third data corresponding to a reflection of the transmitted high frequency signal;
   analyzing some or all of the first, second and third data to determine whether a micro-filter is connected on the line.

19. A method according to claim 18, wherein analyzing includes determining that the micro-filter is connected if the first data indicates that a short circuit condition is present on the line, and if the second data indicates that an open circuit condition is present on the line, and if the third data indicates that the line is not terminated by approximately 100 ohms.

20. A method according to claim 19, wherein analyzing includes comparing a phase response associated with the high frequency and low frequency signals to respective thresholds.

21. A method according to claim 4, further comprising obtaining the threshold for use in the comparing by looking up the threshold in a table of short circuit threshold values using the estimated loop length.

22. A method according to claim 6, further comprising obtaining the threshold for use in the comparing by looking up the threshold in a table of open circuit threshold values using the estimated loop length.

* * * * *